United States Patent
Kuroda et al.

(10) Patent No.: US 12,409,834 B2
(45) Date of Patent: Sep. 9, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Ryusuke Kuroda, Tokyo-to (JP); Kenichiro Aoki, Machida (JP); Tetsuro Sugiura, Chofu (JP); Takuya Fujiki, Tokyo-to (JP); Hitoshi Kamada, Kawasaki (JP); Wataru Kawashima, Nisshin (JP); Tadashi Okubo, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 18/356,492

(22) Filed: Jul. 21, 2023

(65) Prior Publication Data
US 2024/0067168 A1 Feb. 29, 2024

(30) Foreign Application Priority Data
Aug. 25, 2022 (JP) .................... 2022-134209

(51) Int. Cl.
*B60W 30/09* (2012.01)
*B60W 30/095* (2012.01)
*B60W 60/00* (2020.01)

(52) U.S. Cl.
CPC ........ *B60W 30/09* (2013.01); *B60W 30/0956* (2013.01); *B60W 60/0015* (2020.02); *B60W 60/0053* (2020.02); *B60W 2554/4044* (2020.02); *B60W 2554/4046* (2020.02)

(58) Field of Classification Search
None
See application file for complete search history.

(56) References Cited

U.S. PATENT DOCUMENTS

| | | | |
|---|---|---|---|
| 2018/0281793 A1 | 10/2018 | Terayama et al. | |
| 2019/0092390 A1* | 3/2019 | Ide | B60W 30/182 |
| 2020/0057453 A1* | 2/2020 | Laws | G05D 1/0088 |
| 2020/0231151 A1* | 7/2020 | Aoki | B62D 15/0255 |
| 2021/0109535 A1* | 4/2021 | Tansey | G05D 1/0011 |
| 2021/0304618 A1 | 9/2021 | Okuyama et al. | |
| 2023/0347861 A1* | 11/2023 | Sugawara | B60W 30/10 |

FOREIGN PATENT DOCUMENTS

| | | |
|---|---|---|
| JP | 2017-013678 A | 1/2017 |
| JP | 2018-171959 A | 11/2018 |
| JP | 2020-021342 A | 2/2020 |

* cited by examiner

*Primary Examiner* — Anshul Sood
(74) *Attorney, Agent, or Firm* — Sughrue Mion, PLLC

(57) ABSTRACT

A vehicle controller includes a processor configured to detect a vehicle ahead of a host vehicle from time-series sensor signals obtained by a sensor provided on the host vehicle for sensing objects around the host vehicle, track the vehicle ahead detected from the time-series sensor signals, determine whether the vehicle ahead has performed an avoidance action, based on the result of tracking, detect, when the vehicle ahead has performed an avoidance action, a trajectory of an edge of the vehicle ahead opposite a direction of avoidance in the avoidance action, and control travel of the host vehicle so that an edge of the host vehicle opposite the direction of avoidance moves along the detected trajectory.

4 Claims, 5 Drawing Sheets

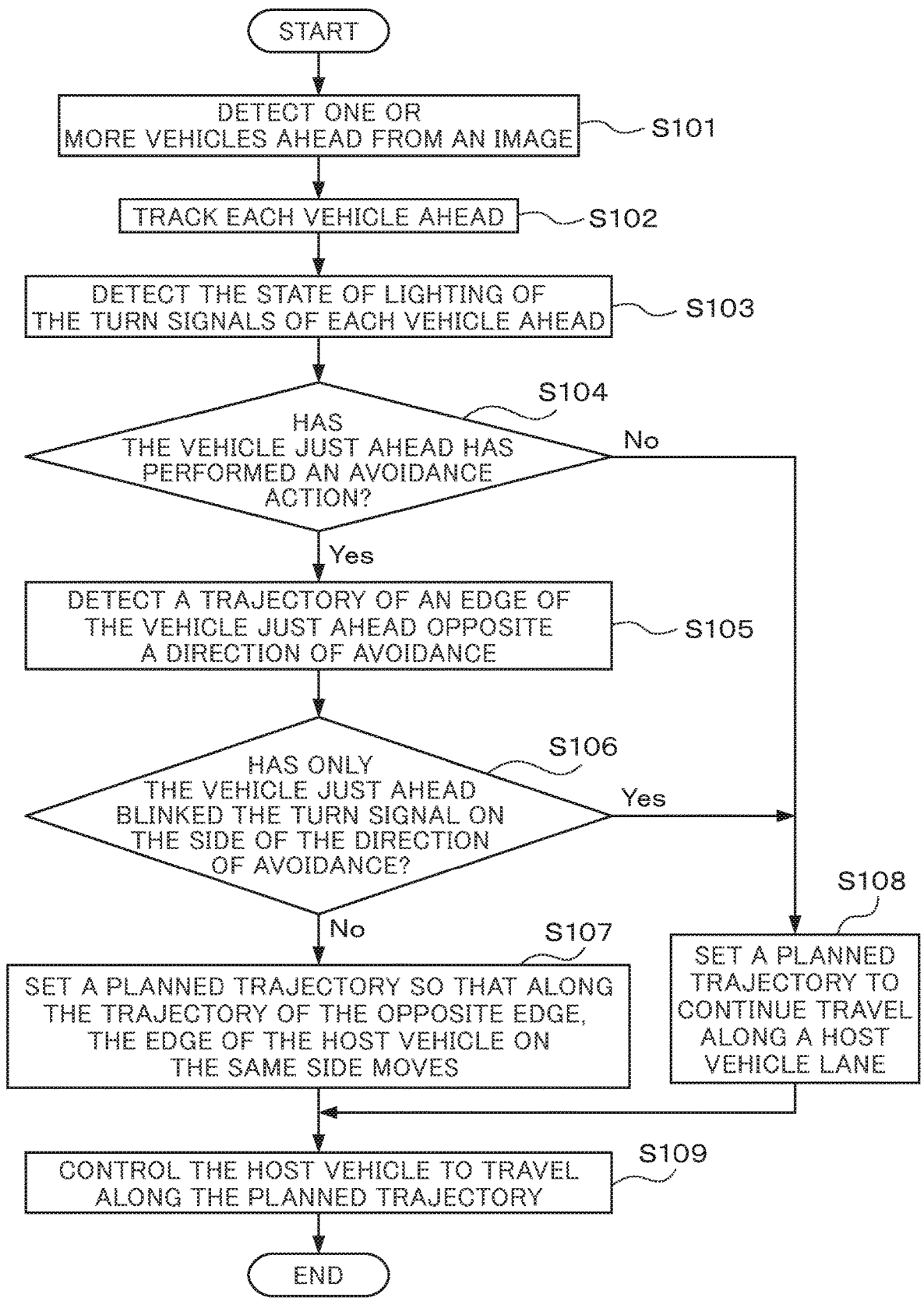

VEHICLE CONTROLLER, METHOD, AND COMPUTER PROGRAM FOR VEHICLE CONTROL

FIELD

The present invention relates to a vehicle controller, a method, and a computer program for controlling travel of a vehicle.

BACKGROUND

When a fallen object is lying on a path of a vehicle under autonomous driving control or damage to the road surface, such as a pothole, on the road surface of the path, it is desirable to control the vehicle to avoid such an obstacle in order to prevent an accident. However, obstacles of indefinite shape, color, and size, such as a fallen object and damage to the road surface, may sometimes not be accurately detected from a sensor signal representing the surroundings of the vehicle, such as an image of the surroundings of the vehicle obtained by a vehicle-mounted camera. This may result in difficulty in controlling the vehicle to avoid an obstacle. In view of this, techniques to control a vehicle to avoid an obstacle on the basis of motion of another vehicle traveling ahead of the vehicle have been proposed (see Japanese Unexamined Patent Publications JP2018-171959A and JP2017-13678A).

A travel support device disclosed in JP2018-171959A calculates the amount of lateral movement of a vehicle traveling ahead on a target path of a host vehicle, based on the motion of the vehicle ahead. When the amount of lateral movement exceeds a predetermined threshold, the travel support device determines that the vehicle ahead has performed an action to avoid an obstacle, and sets the path of the vehicle ahead as the target path of the host vehicle.

A driving support device disclosed in JP2017-13678A calculates a travel route of a vehicle ahead, stores the calculated travel route, and also stores a lateral displacement of the vehicle from a lane center position for the case where lateral acceleration of the vehicle exceeds a lateral acceleration threshold, as a start-point lateral displacement. In addition, the driving support device determines that the vehicle has avoided an obstacle, when the difference between the start-point lateral displacement and a lateral displacement after a predetermined time necessary for avoidance is within a predetermined displacement difference within which it can be determined that the start-point lateral displacement is the same as the lateral displacement after the predetermined time. When determining that the vehicle has avoided an obstacle, the driving support device obtains the travel route of the vehicle during the predetermined time from a storage unit, and controls travel so as to follow the obtained travel route.

SUMMARY

When a host vehicle and a vehicle ahead differ in size, the host vehicle may not be able to avoid an obstacle, even if a vehicle controller controls the host vehicle so that the host vehicle travels along a trajectory of the vehicle ahead avoiding the obstacle.

It is an object of the present invention to provide a vehicle controller that can control travel of a vehicle to avoid an obstacle on the path of the vehicle appropriately.

According to an embodiment, a vehicle controller is provided. The vehicle controller includes a processor configured to: detect a vehicle ahead of a host vehicle from time-series sensor signals obtained by a sensor provided on the host vehicle for sensing objects around the host vehicle, track the vehicle ahead detected from the time-series sensor signals; determine whether the vehicle ahead has performed an avoidance action, based on the result of tracking of the vehicle ahead, detect, when the vehicle ahead has performed an avoidance action, a trajectory of an edge of the vehicle ahead opposite a direction of avoidance in the avoidance action, and control travel of the host vehicle so that an edge of the host vehicle opposite the direction of avoidance moves along the detected trajectory.

The processor is preferably further configured detect the state of lighting of a turn signal of the vehicle ahead, based on time-series sensor signals. The processor preferably determines whether the vehicle ahead turned on a turn signal on the side of the direction of avoidance before an avoidance action, based on the state of lighting of the turn signal of the vehicle ahead, and makes the host vehicle travel along a lane being traveled by the host vehicle, when the vehicle ahead turned on the turn signal on the side of the direction of avoidance before an avoidance action.

Preferably, the processor of the vehicle controller detects a plurality of vehicles ahead of the host vehicle, determines whether the avoidance action has been performed, for each of the vehicles ahead, identifies a location at which a vehicle just ahead of the host vehicle among the vehicles ahead started the avoidance action, and transfers control of the host vehicle to a driver of the host vehicle in the case where each of the vehicles ahead has performed an avoidance action and where the host vehicle is able to stop before reaching the location at which the vehicle just ahead of the host vehicle started the avoidance action.

According to another embodiment, a method for vehicle control is provided. The method includes detecting a vehicle ahead of a host vehicle from time-series sensor signals obtained by a sensor provided on the host vehicle for sensing objects around the host vehicle; tracking the vehicle ahead detected from the time-series sensor signals; determining whether the vehicle ahead has performed an avoidance action, based on the result of tracking; detecting, when the vehicle ahead has performed an avoidance action, a trajectory of an edge of the vehicle ahead opposite a direction of avoidance in the avoidance action; and controlling travel of the host vehicle so that an edge of the host vehicle opposite the direction of avoidance moves along the detected trajectory.

According to still another embodiment, a non-transitory recording medium that stores a computer program for vehicle control is provided. The computer program includes instructions causing a processor mounted on a host vehicle to execute a process including detecting a vehicle ahead of the host vehicle from time-series sensor signals obtained by a sensor provided on the host vehicle for sensing objects around the host vehicle; tracking the vehicle ahead detected from the time-series sensor signals; determining whether the vehicle ahead has performed an avoidance action, based on the result of tracking; detecting, when the vehicle ahead has performed an avoidance action, a trajectory of an edge of the vehicle ahead opposite a direction of avoidance in the avoidance action; and controlling travel of the host vehicle so that an edge of the host vehicle opposite the direction of avoidance moves along the detected trajectory.

The vehicle controller according to the present disclosure has an advantageous effect of being able to control travel of a vehicle to avoid an obstacle on the path of the vehicle appropriately.

BRIEF DESCRIPTION OF DRAWINGS

FIG. 5 is an operation flowchart of the vehicle control process.

DESCRIPTION OF EMBODIMENTS

A vehicle controller, a method for vehicle control executed by the vehicle controller, and a computer program for vehicle control will now be described with reference to the attached drawings. The vehicle controller detects another vehicle traveling ahead of a host vehicle (hereafter a "vehicle ahead") from time-series sensor signals obtained by a sensor provided on the host vehicle for sensing objects around the host vehicle. In addition, the vehicle controller tracks the detected vehicle ahead to determine whether the vehicle ahead has performed an action to avoid an obstacle (hereafter simply an "avoidance action"). When the vehicle ahead has performed an avoidance action, the vehicle controller detects a trajectory of an edge of the vehicle ahead opposite a direction of movement of the vehicle ahead in the avoidance action (hereafter a "direction of avoidance"). The vehicle controller controls travel of the host vehicle so that an edge of the host vehicle opposite the direction of avoidance moves along the detected trajectory.

Figure 1:
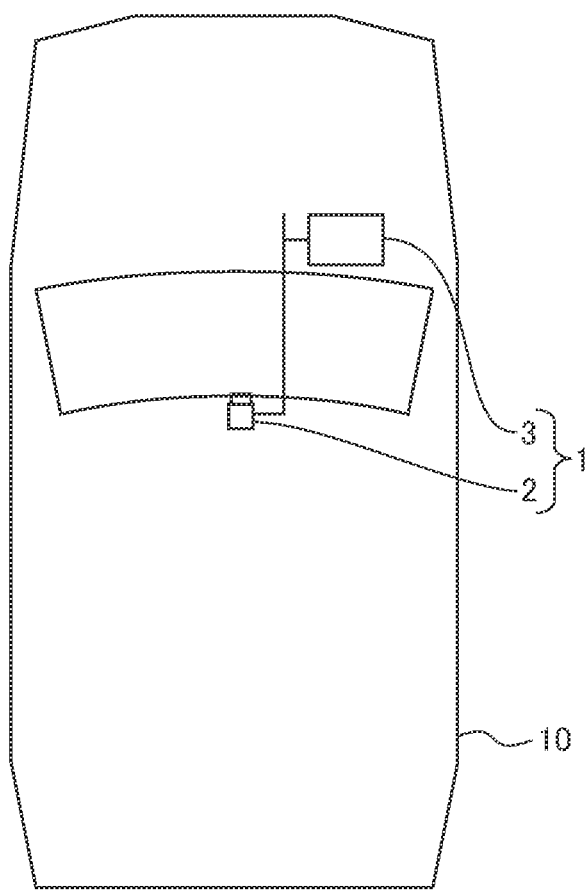
FIG. 1 schematically illustrates the configuration of a vehicle control system equipped with a vehicle controller.
Figure 2:
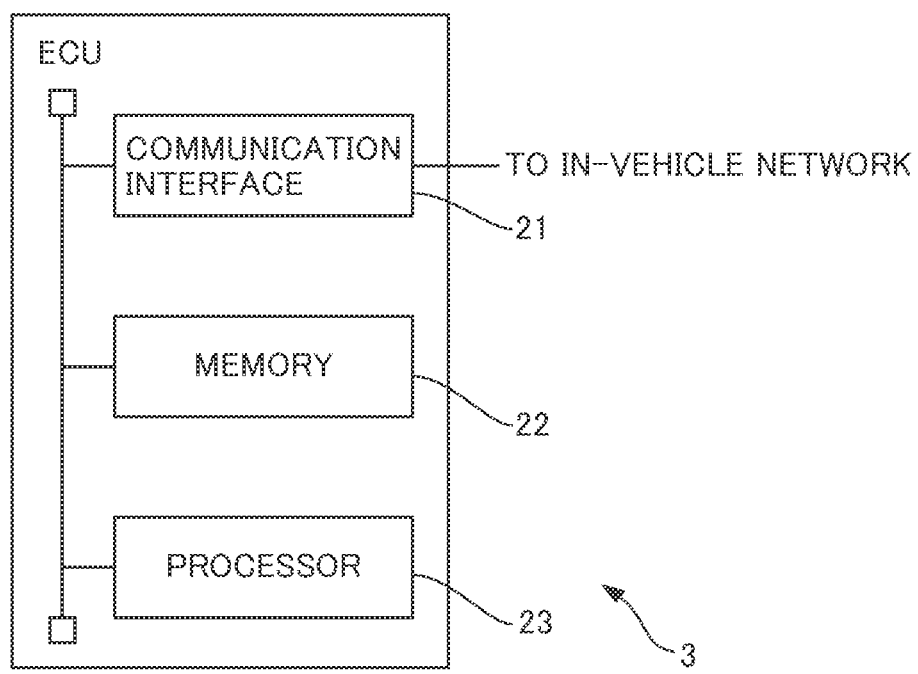
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1, which is mounted on a vehicle 10 and controls the vehicle 10, includes a camera 2 and an electronic control unit (ECU) 3, which is an example of the vehicle controller. The camera 2 is communicably connected to the ECU 3 via an in-vehicle network conforming to a standard such as a controller area network. The vehicle control system 1 may further include a storage device (not illustrated) that stores a map used for autonomous driving control of the vehicle 10. The vehicle control system 1 may further include a range sensor (not illustrated), such as LiDAR or radar, and a receiver (not illustrated) for determining the position of the vehicle 10 in conformity with a satellite positioning system, such as a GPS receiver. The vehicle control system 1 may further include a wireless communication terminal (not illustrated) for wireless communication with another device, and a navigation device (not illustrated) for searching for a planned travel route of the vehicle 10.

The camera 2, which is an example of a sensor for detecting objects around the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented to the front of the vehicle 10. The camera 2 takes pictures of a region in front of the vehicle 10 every predetermined capturing period (e.g., 1/30 to 1/10 seconds), and generates images representing the region. Each image obtained by the camera 2 may be a color or grayscale image. Images generated by the camera 2 are an example of the sensor signals. The vehicle 10 may include multiple cameras taking pictures in different orientations or having different focal lengths.

Every time an image is generated, the camera 2 outputs the generated image to the ECU 3 via the in-vehicle network.

The ECU 3 controls the vehicle 10. In the present embodiment, the ECU 3 controls the vehicle 10 to automatically drive the vehicle 10, based on an avoidance action of a vehicle ahead detected from time-series images obtained by the camera 2. To achieve this, the ECU 3 includes a communication interface 21, a memory 22, and a processor 23.

The communication interface 21, which is an example of a communication unit, includes an interface circuit for connecting the ECU 3 to the in-vehicle network. In other words, the communication interface 21 is connected to the camera 2 via the in-vehicle network. Every time an image is received from the camera 2, the communication interface 21 passes the received image to the processor 23.

The memory 22, which is an example of a storage unit, includes, for example, volatile and nonvolatile semiconductor memories. The memory 22 stores various types of data used in a vehicle control process executed by the processor 23 of the ECU 3, e.g., images received from the camera 2 and various parameters for specifying a classifier used in the vehicle control process. The memory 22 may further store map information representing features related to travel of vehicles, e.g., road markings such as lane-dividing lines or signposts.

The processor 23, which is an example of a control unit, includes one or more central processing units (CPUs) and a peripheral circuit thereof. The processor 23 may further include another operating circuit, such as a logic-arithmetic unit, an arithmetic unit, or a graphics processing unit. Every time an image is received from the camera 2 during travel of the vehicle 10, the processor 23 executes the vehicle control process on the received image. The processor 23 controls the vehicle 10 to automatically drive the vehicle 10, based on an avoidance action of a vehicle ahead detected from an image.

Figure 3:
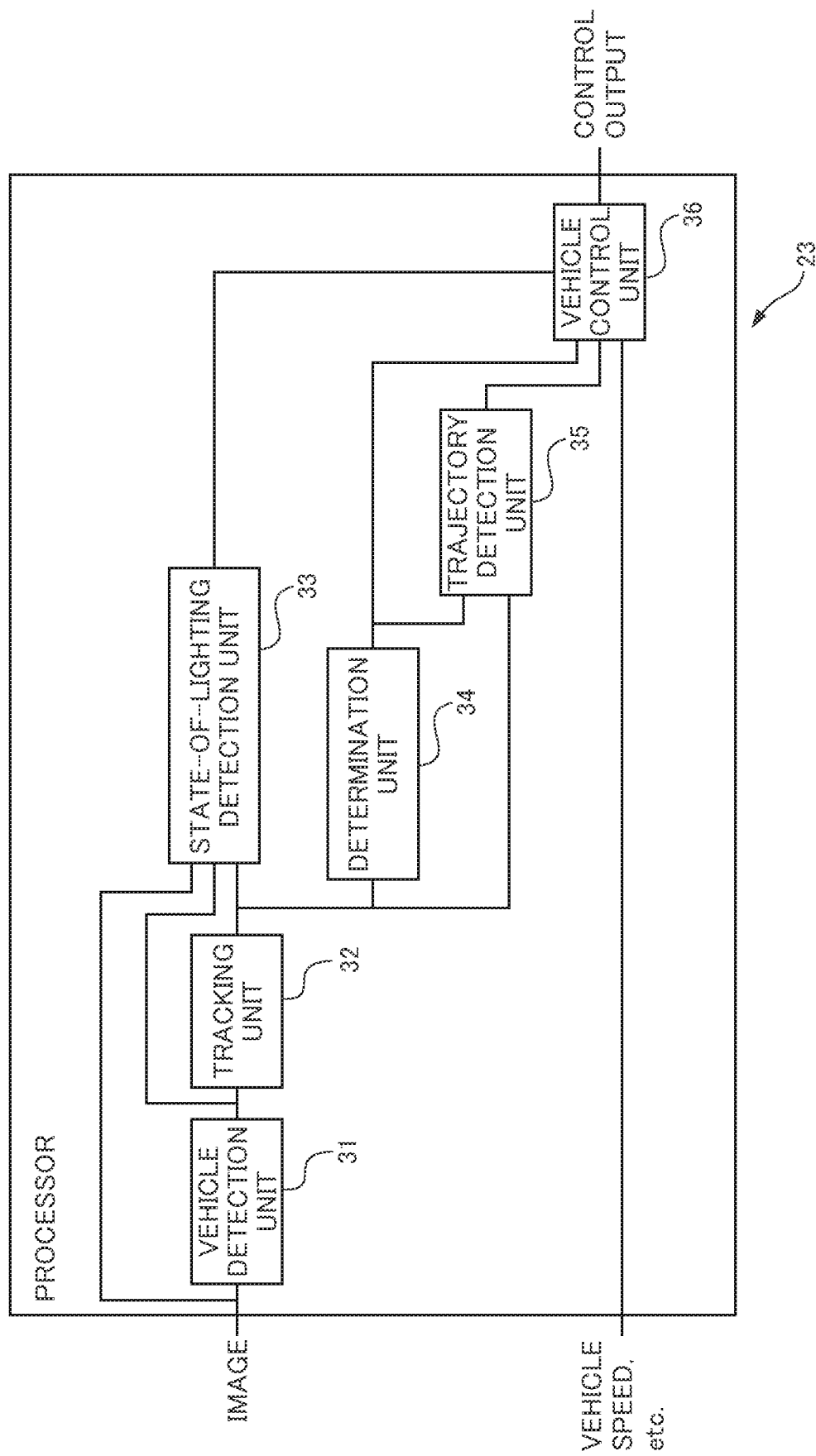
FIG. 3 is a functional block diagram of a processor of the electronic control unit, related to a vehicle control process.

FIG. 3 is a functional block diagram of the processor 23 of the ECU 3, related to the vehicle control process. The processor 23 includes a vehicle detection unit 31, a tracking unit 32, a state-of-lighting detection unit 33, a determination unit 34, a trajectory detection unit 35, and a vehicle control unit 36. These units included in the processor 23 are functional modules, for example, implemented by a computer program executed by the processor 23, or may be dedicated operating circuits provided in the processor 23.

Every time an image is received from the camera 2, the vehicle detection unit 31 detects one or more vehicles ahead from the received image. In the present embodiment, the vehicle detection unit 31 inputs the latest image into a first classifier to detect traveling vehicles around the vehicle 10 which are represented in the image, and identifies vehicles traveling ahead of the vehicle 10 among the detected vehicles.

As the first classifier, the vehicle detection unit 31 uses a "deep neural network" (hereafter a "DNN") that has been trained to detect an object region including a detection target represented in an image (in the present embodiment, a vehicle traveling in an area around the vehicle 10) and to identify the type of the detection target. The DNN used as the first classifier may be, for example, a DNN having architecture of a convolutional neural network (hereafter "CNN") type, such as Single Shot MultiBox Detector (SSD) or Faster R-CNN.

The first classifier is trained in advance with training data including images representing detection targets in accordance with a predetermined training technique, such as backpropagation, so as to detect these detection targets. The use of the first classifier trained in this way enables the vehicle detection unit 31 to detect detection targets accurately from an image.

The detection targets may include objects that affect travel control of the vehicle 10, besides vehicles around the vehicle 10. Examples of such objects include humans, signposts, traffic lights, road markings such as lane-dividing lines, and other objects on roads. In this case, the first classifier is trained in advance to detect these objects. The vehicle detection unit 31 can also detect these objects by inputting an image into the first classifier.

Of the detected vehicles, the vehicle detection unit 31 identifies one or more vehicles traveling ahead of the vehicle 10 on a lane being traveled by the vehicle 10 (hereafter a "host vehicle lane") as vehicles ahead. In the present embodiment, since the camera 2 is mounted so as to take pictures of an area in front of the vehicle 10, a predetermined area including the horizontal center in the image is identified as an area corresponding to the host vehicle lane. Alternatively, the vehicle detection unit 31 may identify a region sandwiched between two lane-dividing lines detected in the image and dividing the host vehicle lane and the left and right adjacent lanes as an area corresponding to the host vehicle lane. The vehicle detection unit 31 then identifies vehicles in the area in the image corresponding to the host vehicle lane as vehicles ahead.

The vehicle detection unit 31 notifies the tracking unit 32 of the positions and areas in the image of object regions representing the detected vehicles ahead.

The tracking unit 32 tracks each vehicle ahead detected from the latest image, by associating the vehicle with a vehicle ahead detected from a past image.

For example, the tracking unit 32 applies a tracking process based on optical flow, such as the Lucas-Kanade method, to an object region representing a vehicle of interest traveling ahead in the latest image and object regions representing a vehicle ahead in past images, thereby tracking the vehicle of interest. To this end, the tracking unit 32 applies, for example, a filter for extracting feature points, such as SIFT or Harris operator, to the object region representing the vehicle of interest, thereby extracting feature points from the object region. The tracking unit 32 then identifies those points in the object regions representing a vehicle ahead in the past images which correspond to the feature points in accordance with the applied tracking technique, thereby calculating optical flow. Alternatively, the tracking unit 32 may apply another tracking technique applied for tracking a moving object detected from an image to the object region representing the vehicle of interest in the latest image and the object regions representing a vehicle ahead in past images, thereby tracking the vehicle of interest.

The tracking unit 32 notifies the result of tracking of each vehicle ahead to the state-of-lighting detection unit 33, the determination unit 34, and the trajectory detection unit 35.

For each vehicle ahead being tracked, the state-of-lighting detection unit 33 detects the state of lighting of the turn signals of the vehicle. The following describes a process on a single vehicle ahead because the state-of-lighting detection unit 33 executes the same process on each vehicle ahead.

The state-of-lighting detection unit 33 inputs characteristics obtained from pixel values in an object region including a vehicle ahead being tracked into a second classifier that executes a convolution operation in the temporal direction. In this way, the state-of-lighting detection unit 33 calculates, for each of the left and right turn signals of the vehicle ahead, a confidence score indicating how likely the turn signal is blinking, and calculates a confidence score indicating how likely none of the left and right turn signals is blinking. The state-of-lighting detection unit 33 detects the state whose confidence score is the highest as the current state of lighting of the turn signals of the vehicle ahead.

As the characteristics obtained from pixel values of an object region representing a vehicle ahead, the state-of-lighting detection unit 33 can use, for example, features included in the object region of a feature map calculated by a convolution layer of the first classifier. For example, when the resolution of the feature map is the same as that of an image inputted into the first classifier, the features included in the region in the feature map corresponding to the object region in the image are the characteristics obtained from pixel values of the object region. When the resolution of the feature map is lower than that of an image inputted into the first classifier, the position and area obtained by correcting the coordinates of the object region as a function of the ratio of the resolution of the feature map to that of the inputted image define the region in the feature map corresponding to the object region. The features included in the region in the feature map are the characteristics obtained from pixel values of the object region. For example, assume that the upper left edge and the lower right edge of the object region in the inputted image are (tlX, tlY) and (brX, brY), respectively, and that the feature map is calculated by scale-down of the inputted image to 1/N (N is an integer not less than two). In this case, the upper left edge and the lower right edge of the region in the feature map corresponding to the object region in the inputted image are (tlX/N, tlY/N) and (brX/N, brY/N), respectively.

According to a modified example, the state-of-lighting detection unit 33 may use pixel values of an object region representing a vehicle ahead in an image inputted into the first classifier as the characteristics to be inputted into the second classifier.

The state-of-lighting detection unit 33 executes downsampling or upsampling on the extracted characteristics of the object region representing the vehicle ahead to resize them to a predetermined size (e.g., 32 by 32). This allows the second classifier to use the inputted characteristics as constant-size ones, even if the relative distance between the vehicle 10 and the vehicle ahead varies during tracking of the vehicle ahead to result in a change in size of the vehicle ahead in an image. Thus, the configuration of the second classifier is simplified.

The state-of-lighting detection unit 33 inputs the characteristics obtained from pixel values of the object regions including the vehicle ahead in time-series images captured in the most recent predetermined period into the second classifier, which executes a convolution operation in the temporal direction, in chronological order. In this way, the second classifier calculates confidence scores of respective possible states of lighting of the turn signals of the vehicle ahead.

It is preferable that the predetermined period be substantially as long as the period of blinking of a turn signal, for the following reasons. In general, when turned on, a turn signal is repeatedly turned on and off every predetermined period of blinking. Thus, the second classifier can accurately calculate the confidence score of the state of lighting of turn signals in response to input of characteristics obtained from images captured in a period longer than the period of blinking. However, the longer the predetermined period, the greater the number of characteristics to be inputted into the second classifier. This increases the amount of computation of the second classifier and thus requires more hardware resources for the operation of the second classifier. Thus, it is preferable that the predetermined period be short in terms of the required hardware resources. For these reasons, it is preferable that the predetermined period be substantially as long as the period of blinking of a turn signal, as stated above. However, in the case where there are enough hardware resources for the ECU 3, the predetermined period may be longer than the period of blinking of a turn signal. In this case, the length of the predetermined period is set, for example, at designing and training the second classifier, so as to optimize the amount of required hardware resources and the accuracy of identification of the state of lighting of turn signals; these are conflicting with each other.

As the second classifier that executes a convolution operation in the temporal direction, the state-of-lighting detection unit 33 can use a neural network having architecture of a CNN type. In this case, the second classifier includes, for example, one or more convolution layers that execute a convolution operation on a feature map outputted from the immediately preceding layer along the temporal direction (hereafter "temporal-feature convolution layers"). The size of a kernel in the temporal direction of the individual temporal-feature convolution layers is set, for example, so that the convolution operation may be executed all over the predetermined period including characteristics inputted all at once by going through all of the temporal-feature convolution layers. The temporal-feature convolution layers may execute a convolution operation, for example, in both the temporal direction and the spatial directions (hereafter a "three-dimensional convolution operation") or a convolution operation only in the temporal direction (hereafter a "time-dimensional convolution operation"). The temporal-feature convolution layers may also execute a convolution operation or a fully-connected operation in the channel direction. In the case where the second classifier includes multiple temporal-feature convolution layers, some of the temporal-feature convolution layers may execute a three-dimensional convolution operation whereas the other temporal-feature convolution layers may execute a time-dimensional convolution operation. The second classifier may further include one or more convolution layers that execute a convolution operation in the spatial directions but not in the temporal direction (hereafter "spatial-feature convolution layers"). The spatial-feature convolution layers may also execute a convolution operation or a fully-connected operation in the channel direction. In the case where the second classifier includes one or more spatial-feature convolution layers, the spatial-feature convolution layers and the temporal-feature convolution layers may be disposed in any order. For example, the spatial-feature convolution layers and the temporal-feature convolution layers may be provided in the order from the input toward the output, or in the opposite order. The spatial-feature convolution layers may alternate with the temporal-feature convolution layers. The second classifier may further include one or more pooling layers. The second classifier may further include one or more activation layers and one or more fully-connected layers. The output layer of the second classifier uses, for example, a sigmoid function or a softmax function as an activation function, and outputs confidence scores of respective possible states of lighting of turn signals.

Examples of training data used for training the second classifier include combinations of a set of characteristics obtained from object regions including a vehicle in respective time-series images obtained in the predetermined period and a label indicating the state of lighting of turn signals corresponding to the set of characteristics. The second classifier trained with a large number of pieces of such training data in accordance with backpropagation can accurately calculate confidence scores of respective possible states of lighting of turn signals.

Since the second classifier merely has to process characteristics included in an object region, the second classifier includes smaller input and intermediate layers and is specified by fewer parameters, including weighting factors, than the first classifier. For this reason, the amount of computation of the second classifier is less than that of the first classifier, allowing for reducing the computational burden on the processor 23. Further, the amount of computation required to train the second classifier is also reduced. In the case where the first and second classifiers are configured as neural networks, these neural networks may be trained together by backpropagation with common training data.

As the second classifier, the state-of-lighting detection unit 33 may use, for example, a neural network having a recursive structure, such as a recurrent neural network (RNN), a long short-term memory (LSTM), or a gated recurrent unit (GRU). Such a neural network having a recursive structure retains the result of operation calculated from data inputted by the last time as an internal state, and refers to the result of operation retained as the internal state at every input of new data. Thus, time-varying changes in outward appearance of the turn signals of a vehicle ahead are used for calculating confidence scores of individual states of lighting of the turn signals. Therefore, the state-of-lighting detection unit 33 can accurately calculate confidence scores of the states of lighting of the turn signals of the vehicle ahead, using a neural network having a recursive structure as the second classifier. The second classifier that is a neural network having a recursive structure is also trained using training data like that described above.

In this case, every time an image is obtained from the camera 2, the state-of-lighting detection unit 33 inputs characteristics obtained from pixel values of the object region including a vehicle ahead into the second classifier. In this way, the state-of-lighting detection unit 33 can calculate confidence scores of respective possible states of lighting of the turn signals of the vehicle ahead.

The state-of-lighting detection unit 33 identifies a state having the highest confidence score of the confidence scores of respective possible states of lighting of the turn signals of the vehicle ahead. The state-of-lighting detection unit 33 detects the state having the highest confidence score of the possible states of lighting of the turn signals as the current state of lighting of the turn signals. For example, when the confidence score of the state in which the left turn signal of the vehicle ahead is blinking is the highest, the state-of-lighting detection unit 33 detects the state in which the left turn signal of the vehicle ahead is blinking, as the current state of lighting of the turn signals of the vehicle ahead. When the confidence score of the state in which the left and right turn signals of the vehicle ahead are turned off is the highest, the state-of-lighting detection unit 33 detects the state in which both turn signals of the vehicle ahead are turned off, as the current state of lighting of the turn signals of the vehicle ahead.

The state-of-lighting detection unit 33 notifies the vehicle control unit 36 of the result of detection of the state of lighting of turn signals for each vehicle ahead being tracked.

The determination unit 34 determines whether the vehicle traveling just ahead of the vehicle 10 among the vehicles ahead has performed an avoidance action. It is supposed that as a vehicle ahead is closer to the vehicle 10, the vehicle ahead is larger in size in an image generated by the camera 2 and the bottom position of the vehicle ahead in the image is closer to the bottom of the image. Thus, the determination unit 34 identifies a vehicle ahead represented in the largest object region in the latest image of the vehicles ahead as the vehicle traveling just ahead of the vehicle 10. Alternatively, the determination unit 34 may identify a vehicle ahead represented in the object region closest to the bottom of the latest image of the vehicles ahead as the vehicle traveling just ahead of the vehicle 10.

Based on the result of tracking of the vehicle just ahead of the vehicle 10, the determination unit 34 determines that the vehicle ahead has performed an avoidance action, when the speed of movement of the vehicle ahead in a direction perpendicular to the travel direction of the vehicle 10 (the direction will be referred to as a "lateral" direction below for the sake of convenience) is not less than a predetermined speed threshold. In this case, the determination unit 34 can estimate the lateral speed, based on changes in the position of the vehicle ahead in images obtained during tracking of the vehicle. For example, the bottom of an object region representing a vehicle ahead is assumed to correspond to the position at which the vehicle touches the road surface. Thus, the determination unit 34 can estimate the distance from the vehicle 10 to a vehicle ahead, based on parameters of the camera 2, such as the focal length, the orientation, and the height of the mounted position of the camera 2, and the bottom position of the object region representing the vehicle ahead. In addition, the position of a vehicle ahead in an image corresponds one-to-one to the direction from the camera 2 to the vehicle. Thus, if the distance from the vehicle 10 to the vehicle ahead can be estimated, the amount of lateral movement of the vehicle ahead between the times of generation of images obtained during tracking is estimated on the basis of changes in the lateral position of the vehicle ahead between the images and the amount of lateral movement of the vehicle 10 between the times of generation of the images. Thus, the determination unit 34 can estimate the speed of lateral movement of the vehicle ahead by dividing the amount of lateral movement by the interval between the times of generation of the images. The determination unit 34 can estimate the amount of lateral movement of the vehicle 10 between the times of generation of the images, based on a yaw rate obtained, for example, by a gyro sensor mounted on the vehicle 10. Alternatively, the determination unit 34 can estimate the position and direction of the vehicle 10 at the time of generation of each image by determining the position and direction of the vehicle 10 for the case where features detected from the image and projected onto a map match corresponding features on the map the best. Thus, the determination unit 34 can estimate the amount of lateral movement of the vehicle 10 between the times of generation of the images, based on the position of the vehicle 10 at the time of generation of each image. In the case where the vehicle 10 is equipped with a range sensor, the determination unit 34 can estimate the distance from the vehicle 10 to the vehicle ahead to be the distance measured by the range sensor in the direction corresponding to the position of the vehicle ahead in an image obtained by the camera 2. Thus, the determination unit 34 may estimate the lateral speed of the vehicle ahead, based on changes in the distance and direction from the vehicle 10 to the vehicle ahead during tracking and the amount of lateral movement of the vehicle 10 between the times of generation of the images.

Alternatively, the determination unit 34 may determine that the vehicle ahead has performed an avoidance action, when the amount of lateral movement of the vehicle ahead exceeds a predetermined movement threshold. Alternatively, the determination unit 34 may determine that the vehicle ahead has performed an avoidance action, when the lateral acceleration of the vehicle ahead exceeds a predetermined acceleration threshold. In this case, the determination unit 34 can estimate the lateral acceleration of the vehicle ahead at the time of generation of each image by dividing the speed of lateral movement of the vehicle ahead at the time of generation of each image by the interval between the times of generation of the images. Alternatively, the determination unit 34 may determine that the vehicle ahead has performed an avoidance action, when two or more of the above-described criteria for determining an avoidance action are satisfied.

The determination unit 34 notifies the trajectory detection unit 35 and the vehicle control unit 36 of the result of determination whether the vehicle just ahead of the vehicle 10 has performed an avoidance action.

The trajectory detection unit 35 refers to the result of determination whether the vehicle just ahead of the vehicle 10 has performed an avoidance action, which is notified by the determination unit 34. When it is determined that the vehicle ahead has performed an avoidance action, the trajectory detection unit 35 detects a trajectory of an edge of the vehicle ahead opposite a direction of avoidance in the avoidance action (hereafter referred to simply as an "opposite edge" for convenience of description). For example, the trajectory detection unit 35 assumes a predetermined period before and after the time when it is determined that the vehicle ahead has performed an avoidance action to be the period of the avoidance action (hereafter the "avoidance action period"). To this end, the trajectory detection unit 35 may determine the time when the lateral displacement of the vehicle ahead from the center of a host vehicle lane being traveled by the vehicle 10 exceeds a predetermined distance, as the start time of the avoidance action, i.e., the start time of the avoidance action period. Alternatively, the trajectory detection unit 35 may determine the time when the lateral speed or acceleration of the vehicle ahead exceeds a predetermined avoidance start threshold, as the start time of the avoidance action period. The avoidance start threshold is preferably set below the movement threshold and the acceleration threshold. The trajectory detection unit 35 determines the position of the vehicle ahead at the start time of the avoidance action as the start point of the avoidance action. The trajectory detection unit 35 assumes that an edge of the object region representing the vehicle ahead in each image opposite the direction of avoidance in the avoidance action period corresponds to the opposite edge of the vehicle ahead. The trajectory detection unit 35 then applies viewpoint transformation to the edge of the object region corresponding to the edge of the vehicle ahead in each image in the avoidance action period, using parameters of the camera 2, thereby estimating the position of the opposite edge of the vehicle ahead in an aerial image with the camera 2 as the origin. In addition, the trajectory detection unit 35 transforms the position of the opposite edge of the vehicle ahead in the aerial image at the time of generation of each image in the avoidance action period into a position in the world coordinate system, based on the position and direction of the vehicle 10 at the time of generation of each image. The trajectory detection unit 35 can detect a trajectory of the opposite edge of the vehicle ahead in the avoidance action period, by arranging the positions after the transformation in chronological order. The trajectory detection unit 35 estimates the position and direction of the vehicle 10 at the time of generation of each image by comparison of features detected from the image with corresponding features represented in a map, as described in relation to the determination unit 34. Alternatively, the trajectory detection unit 35 may obtain the position and direction of the vehicle 10 at the time of generation of each image from the determination unit 34.

The trajectory detection unit 35 notifies the vehicle control unit 36 of the trajectory of the opposite edge of the vehicle ahead.

The vehicle control unit 36 refers to the result of determination whether the vehicle just ahead of the vehicle 10 has performed an avoidance action, which is notified by the determination unit 34. When it is determined that the vehicle ahead has performed an avoidance action, the vehicle control unit 36 sets a planned trajectory of the vehicle 10 so that the opposite edge of the vehicle 10 moves along the trajectory of the opposite edge of the vehicle ahead notified by the trajectory detection unit 35. When it is determined that the vehicle just ahead has not performed an avoidance action, the vehicle control unit 36 sets a planned trajectory so that the vehicle 10 continues traveling along a lane being traveled by the vehicle 10.

The vehicle control unit 36 controls components of the vehicle 10 so that the vehicle 10 travels along the set planned trajectory. For example, the vehicle control unit 36 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 is equal to the target acceleration. The vehicle control unit 36 then determines the amount of fuel injection according to the set degree of accelerator opening, and outputs a control signal depending on the amount of fuel injection to a fuel injector of an engine of the vehicle 10. Alternatively, the vehicle control unit 36 controls a power supply of a motor for driving the vehicle 10 so that electric power depending on the set degree of accelerator opening is supplied to the motor. Alternatively, the vehicle control unit 36 outputs a control signal depending on the set amount of braking to the brake of the vehicle 10. In addition, the vehicle control unit 36 determines the steering angle of the vehicle 10 for the vehicle 10 to travel along the planned trajectory, based on the planned trajectory and the current position of the vehicle 10, and outputs a control signal depending on the steering angle to an actuator (not illustrated) that controls the steering wheel of the vehicle 10.

Figure 4:
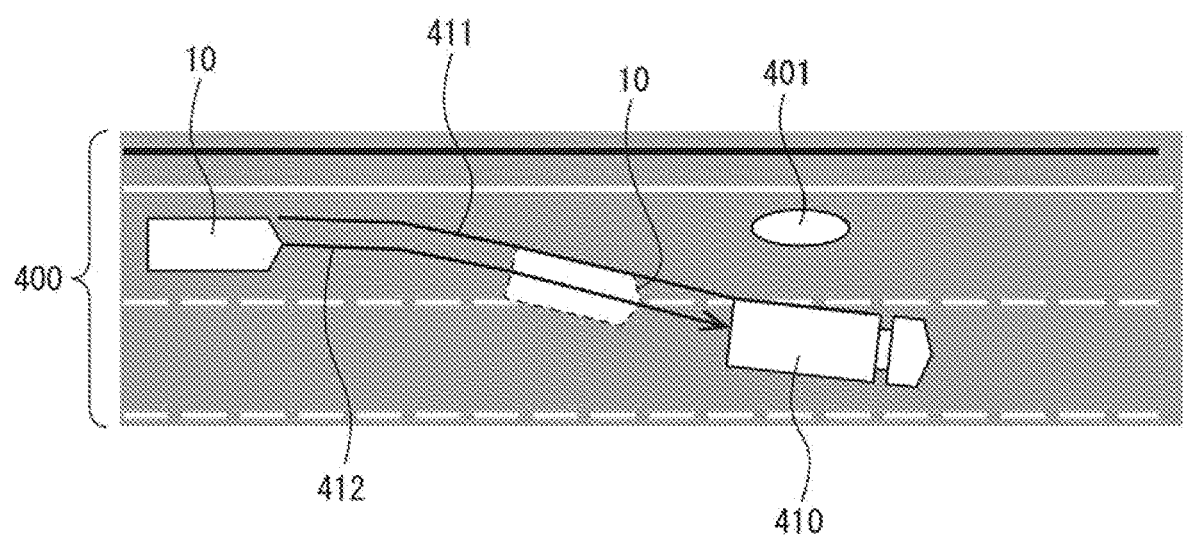
FIG. 4 illustrates an example of the relationship between a trajectory of an edge of a vehicle just ahead of a host vehicle opposite the direction of avoidance and a planned trajectory of the host vehicle.

FIG. 4 illustrates an example of the relationship between a trajectory of an opposite edge of a vehicle just ahead of the vehicle 10 and a planned trajectory of the vehicle 10. In the example illustrated in FIG. 4, there is a fallen object 401 ahead of the vehicle 10 on a road 400 being traveled by the vehicle 10. For this reason, a vehicle 410 traveling just ahead of the vehicle 10 performs an avoidance action to avoid the fallen object 401, thereby moving rightward with respect to the travel direction of the vehicle 410 (i.e., the direction of avoidance is the right hand with respect to the travel direction of the vehicle 10). Thus, a trajectory 411 of the left edge of the vehicle 410 is detected, and a planned trajectory 412 of the vehicle 10 is set so that the left edge of the vehicle 10 moves along the trajectory 411.

In this way, a planned trajectory is set so that the vehicle 10 will not collide with a fallen object even if the vehicle 10 and the vehicle ahead differ in size (in particular, in width). Thus the vehicle control unit 36 can control travel of the vehicle 10 so that the vehicle 10 will not collide with the fallen object.

Even if it is determined that a vehicle just ahead has performed an avoidance action, the vehicle ahead may have made a lane change, for example, to merely overtake, in the case where the vehicle ahead was blinking the turn signal on the side of the direction of avoidance in a predetermined period (e.g., several seconds) just before the start of the avoidance action. In view of this, the vehicle control unit 36 determines whether the vehicle just ahead was blinking the turn signal on the side of the direction of avoidance in the predetermined period just before the start of the avoidance action of the vehicle, based on the result of detection of the state of lighting of the turn signals. In the case where the vehicle just ahead was blinking the turn signal on the side of the direction of avoidance in the predetermined period, the vehicle control unit 36 may set a planned trajectory so that the vehicle 10 continues traveling along a lane being traveled by the vehicle 10.

In some cases, not only the vehicle just ahead of the vehicle 10 but also another vehicle traveling further ahead of the vehicle just ahead may blink a turn signal on the side of a direction of avoidance. In this case, the vehicle just ahead may have looked at the action of the vehicle further ahead and thereby performed an avoidance action. Thus, in the case where each of vehicles ahead including the vehicle just ahead was blinking a turn signal on the side of a direction of avoidance in a predetermined period just before it is determined that the vehicle just ahead has performed an avoidance action, the vehicle control unit 36 may set a planned trajectory of the vehicle 10 in the same manner as described above. More specifically, in this case, the vehicle control unit 36 may set a planned trajectory of the vehicle 10 so that the opposite edge of the vehicle 10 moves along the trajectory of the opposite edge of the vehicle just ahead.

FIG. 5 is an operation flowchart of the vehicle control process executed by the processor 23. The processor 23 executes the vehicle control process at predetermined intervals in accordance with the operation flowchart illustrated in FIG. 5.

The vehicle detection unit 31 of the processor 23 detects one or more vehicles ahead from an image received from the camera 2 (step S101).

The tracking unit 32 of the processor 23 tracks each vehicle ahead detected from the latest image, by associating the vehicle with a vehicle ahead detected from a past image (step S102).

For each vehicle ahead being tracked, the state-of-lighting detection unit 33 of the processor 23 detects the state of lighting of the turn signals of the vehicle (step S103).

In addition, the determination unit 34 of the processor 23 determines whether the vehicle traveling just ahead of the vehicle 10 among the vehicles ahead has performed an avoidance action, based on the result of tracking (step S104).

When it is determined that the vehicle just ahead has performed an avoidance action (Yes in step S104), the trajectory detection unit 35 of the processor 23 detects a trajectory of an edge of the vehicle ahead opposite a direction of avoidance in the avoidance action (step S105).

Thereafter, the vehicle control unit 36 of the processor 23 determines whether only the vehicle just ahead of the vehicle 10 among the vehicles ahead has blinked the turn signal on the side of the direction of avoidance in a predetermined period before the avoidance action, based on the state of lighting of the turn signals of each vehicle ahead (step S106). When vehicles ahead have blinked the turn signal on the side of the direction of avoidance or when the vehicle just ahead has not blinked the turn signal on the side of the direction of avoidance (No in step S106), the vehicle just ahead is supposed to have performed the avoidance action to avoid a certain obstacle. Thus, the vehicle control unit 36 sets a planned trajectory of the vehicle 10 so that the opposite edge of the vehicle 10 moves along the trajectory of the edge on the same side of the vehicle ahead (step S107).

When it is determined that the vehicle just ahead has not performed an avoidance action in step S104 (No in step S104), the vehicle control unit 36 sets a planned trajectory so that the vehicle 10 continues traveling along a host vehicle lane (step S108). When only the vehicle just ahead has blinked the turn signal on the side of the direction of avoidance in a predetermined period before the avoidance action in step S106 (Yes in step S106), the vehicle just ahead may have taken action, e.g., changed lanes, to merely overtake. Thus, the vehicle control unit 36 sets a planned trajectory so that the vehicle 10 continues traveling along a host vehicle lane (step S108).

After setting a planned trajectory, the vehicle control unit 36 controls components of the vehicle 10 so that the vehicle 10 travels along the planned trajectory (step S109). The processor 23 then terminates the vehicle control process.

As has been described above, the vehicle controller tracks detected vehicles ahead and determines whether the vehicle just ahead of the host vehicle has performed an avoidance action. When the vehicle ahead has performed an avoidance action, the vehicle controller sets a planned trajectory so that the opposite edge of the host vehicle moves along the trajectory of the opposite edge of the vehicle ahead. Thus, even if there is an obstacle that is unlikely to be accurately detected, such as a fallen object or damage of the road surface, on the path of the host vehicle, the vehicle controller controls the host vehicle to avoid the obstacle and thereby can prevent an accident from occurring. In particular, the vehicle controller controls travel of the host vehicle so that the opposite edge of the host vehicle moves along the trajectory of the edge on the same side of the vehicle ahead, and thereby can control the host vehicle to avoid the obstacle even if the vehicle ahead and the host vehicle differ in size.

According to a modified example, the determination unit 34 may similarly determine whether not only the vehicle just ahead of the vehicle 10 but also another vehicle ahead has performed an avoidance action. The vehicle control unit 36 may transfer control of the vehicle 10 to the driver in the case where vehicles ahead have performed an avoidance action and where it is possible to stop the vehicle 10 before reaching the location at which the vehicle just ahead started the avoidance action. For example, in the case where decelerating the vehicle 10 from the current speed at a predetermined deceleration will decrease the speed of the vehicle 10 to zero before reaching the location at which the vehicle just ahead started the avoidance action, the determination unit 34 determines that it is possible to stop the vehicle 10 before reaching that location. In this case, the vehicle control unit 36 notifies the driver that control will be transferred and that there may be an obstacle ahead of the vehicle 10, via a user interface, such as a display, a speaker, or a vibrator, provided in the interior of the vehicle 10. When hold of the steering wheel by the driver is sensed via a touch sensor in the steering after a predetermined period from the notification, the vehicle control unit 36 transfers control to the driver. When hold of the steering wheel by the driver is not sensed even after the predetermined period, the vehicle control unit 36 may control components of the vehicle 10 to stop the vehicle 10 before reaching the location at which the vehicle just ahead started the avoidance action. In this way, the vehicle control unit 36 can prevent a collision of the vehicle 10 with an obstacle more reliably when the obstacle may exist ahead of the vehicle 10, and can avoid the vehicle 10 from performing an unnecessary avoidance action when no obstacle actually exists.

According to another modified example, the vehicle detection unit 31 may detect vehicles ahead, based on a sensor signal obtained by a sensor, other than the camera 2, for sensing objects around the vehicle 10, e.g., a ranging signal of a range sensor. In this case, the first classifier used by the vehicle detection unit 31 is trained in advance to output a confidence score of a vehicle from a sensor signal obtained by the sensor for each of regions set within the detection range of the sensor. In this case also, the first classifier may be configured by a DNN as in the embodiment or modified examples. Alternatively, the first classifier may be a classifier based on a machine learning technique different from a DNN, such as a support vector machine.

According to still another modified example, the vehicle control unit 36 may set a planned trajectory without referring to the state of lighting of the turn signals of the vehicle just ahead. More specifically, when the vehicle just ahead has performed an avoidance action, the vehicle control unit 36 may set a planned trajectory so that the edge of the vehicle 10 opposite the direction of avoidance moves along the trajectory of the edge on the same side of the vehicle ahead. This enables the vehicle control unit 36 to prevent a collision of the vehicle 10 with an obstacle more reliably, although the vehicle 10 may perform an unnecessary avoidance action in some cases. According to this modified example, processing of the state-of-lighting detection unit 33 may be omitted.

In some cases, e.g., when a large-size vehicle is traveling on an adjacent lane on the side of a direction of avoidance, it may be not preferable to set a trajectory so that the edge of the vehicle 10 opposite the direction of avoidance moves along the trajectory of the edge opposite the direction of avoidance of the vehicle ahead. Thus, according to yet another modified example, the vehicle control unit 36 may set a planned trajectory so that the edge of the vehicle 10 on the same side as the opposite edge moves along the trajectory of the opposite edge of the vehicle ahead with a predetermined distance from the trajectory.

The computer program for achieving the functions of the units of the processor 23 of the vehicle controller according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present invention.

What is claimed is:
1. A vehicle controller comprising:
a processor configured to:

detect a vehicle ahead of a host vehicle from time-series sensor signals obtained by a sensor provided on the host vehicle for sensing objects around the host vehicle, track the vehicle ahead detected from the time-series sensor signals, determine whether the vehicle ahead has performed an avoidance action, based on a result of tracking, detect, when the vehicle ahead has performed the avoidance action, a trajectory of an edge of the vehicle ahead opposite a direction of avoidance in the avoidance action, control travel of the host vehicle so that an edge of the host vehicle opposite the direction of avoidance moves along the trajectory, detect a plurality of vehicles ahead of the host vehicle, determine whether the avoidance action has been performed, for each of the vehicles ahead, identify a location at which a vehicle just ahead of the host vehicle among the vehicles ahead started the avoidance action, and transfer control of the host vehicle to a driver of the host vehicle in a case where each of the vehicles ahead has performed the avoidance action and where the host vehicle is able to stop before reaching the location at which the vehicle just ahead of the host vehicle started the avoidance action.

2. The vehicle controller according to claim 1, wherein the processor is further configured to detect a state of lighting of a turn signal of the vehicle ahead, based on the time-series sensor signals, wherein the processor is further configured to determine whether the vehicle ahead turned on a turn signal on the side of the direction of avoidance before the avoidance action, based on the state of lighting, and make the host vehicle travel along a lane being traveled by the host vehicle, when the vehicle ahead turned on the turn signal on the side of the direction of avoidance before the avoidance action.

3. A method for vehicle control, comprising:

detecting a vehicle ahead of a host vehicle from time-series sensor signals obtained by a sensor provided on the host vehicle for sensing objects around the host vehicle;

tracking the vehicle ahead detected from the time-series sensor signals;

determining whether the vehicle ahead has performed an avoidance action, based on a result of tracking;

detecting, when the vehicle ahead has performed the avoidance action, a trajectory of an edge of the vehicle ahead opposite a direction of avoidance in the avoidance action;

controlling travel of the host vehicle so that an edge of the host vehicle opposite the direction of avoidance moves along the trajectory;

detecting a plurality of vehicles ahead of the host vehicle;

determining whether the avoidance action has been performed, for each of the vehicles ahead;

identifying a location at which a vehicle just ahead of the host vehicle among the vehicles ahead started the avoidance action; and transferring control of the host vehicle to a driver of the host vehicle in a case where each of the vehicles ahead has performed the avoidance action and where the host vehicle is able to stop before reaching the location at which the vehicle just ahead of the host vehicle started the avoidance action.

4. A non-transitory recording medium that stores a computer program for vehicle control, the computer program causing a processor mounted on a host vehicle to execute a process comprising:

detecting a vehicle ahead of the host vehicle from time-series sensor signals obtained by a sensor provided on the host vehicle for sensing objects around the host vehicle;

tracking the vehicle ahead detected from the time-series sensor signals;

determining whether the vehicle ahead has performed an avoidance action, based on a result of tracking;

detecting, when the vehicle ahead has performed the avoidance action, a trajectory of an edge of the vehicle ahead opposite a direction of avoidance in the avoidance action;

controlling travel of the host vehicle so that an edge of the host vehicle opposite the direction of avoidance moves along the trajectory;

detecting a plurality of vehicles ahead of the host vehicle;

determining whether the avoidance action has been performed, for each of the vehicles ahead;

identifying a location at which a vehicle just ahead of the host vehicle among the vehicles ahead started the avoidance action; and transferring control of the host vehicle to a driver of the host vehicle in a case where each of the vehicles ahead has performed the avoidance action and where the host vehicle is able to stop before reaching the location at which the vehicle just ahead of the host vehicle started the avoidance action.

* * * * *